[19] United States Patent
Quackenbush et al.

[11] 3,882,238
[45] May 6, 1975

[54] SULFONATE ESTERS AS CHOLESTEROL-LOWERING AGENTS

[75] Inventors: Forrest W. Quackenbush, Brookston; Phillip G. Rand, Elkhart, both of Ind.

[73] Assignee: Purdue Research Foundation, West Lafayette, Ind.

[22] Filed: Nov. 13, 1972

[21] Appl. No.: 306,083

[52] U.S. Cl............................ 424/303; 424/226
[51] Int. Cl........................... A01n 9/14; A01n 9/20
[58] Field of Search......... 424/303, 226; 260/456 R, 260/456 P

[56] References Cited
UNITED STATES PATENTS
2,515,577  7/1950  Waldeck.................. 260/456 P
3,134,715  6/1960  Mitchell.................. 424/303
3,202,691  8/1965  Wenham et al.......... 260/456 R

*Primary Examiner*—Albert T. Meyers
*Assistant Examiner*—Douglas W. Robinson
*Attorney, Agent, or Firm*—William C. Martens; Everet F. Smith

[57] ABSTRACT

Long chain sulfonate esters of the formula

[R″ — SO$_3$]$_m$R′ 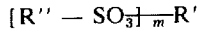

in which R′ is a saturated or unsaturated group having from 8 to 25 carbon atoms, at least 8 carbon atoms of which are in a straight chain, and said group is bonded to the sulfonyl function through a primary or secondary carbon atom, are active as cholesterol-lowering agents.

11 Claims, No Drawings

SULFONATE ESTERS AS CHOLESTEROL-LOWERING AGENTS

BACKGROUND AND SUMMARY OF THE INVENTION

This invention relates to a method for reducing the concentration of cholesterol in warm-blooded animals as well as to compositions and compounds useful in the reduction of the cholesterol concentration in warm-blooded animals.

Thus, the compounds of this invention have the formula

in which R is cyclohexadienyl, $C_1$-$C_{12}$ alkyl substituted cyclohexadienyl, phenylcyclohexadienyl, $C_1$-$C_{12}$ alkyl substituted naphthyl, indanyl, cyclohexenyl, $C_1$-$C_{12}$ alkyl substituted cyclohexenyl, phenylcyclohexenyl, $C_1$-$C_{12}$ alkyl substituted cyclohexyl, phenylcyclohexyl,

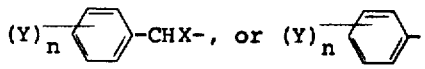

in which $n$ is an integer from 1 to 3, and, when $n$ is 1, Y is $C_2$-$C_{20}$ alkyl, phenyl, halo, $C_1$-$C_3$ alkoxy, $C_2$-$C_3$ alkenyl, carboxy, nitro, halomethyl, or phenylazo, and, when $n$ is 2 or 3, each Y independently is $C_1$-$C_{20}$ alkyl, phenyl, halo, $C_1$-$C_3$ alkoxy, $C_2$-$C_3$ alkenyl, carboxy, nitro, halomethyl, or phenylazo;

X is hydrogen, phenyl, benzyl, $C_1$-$C_{12}$ alkyl, $C_1$-$C_{12}$ alkylbenzyl, or $C_1$-$C_{12}$ alkylphenyl;

$m$ is 1 or 2; and

R' is a saturated or unsaturated group having from 8 to 25 carbon atoms, at least 8 carbon atoms of which are in a straight chain, and said group is bonded to the sulfonyl function through a primary or secondary carbon atom.

This invention also comprises a pharmaceutical composition having cholesterol-lowering activity comprising a significant quantity of an inert pharmaceutical carrier, or diluent, and, in unit dosage form, from about 0.1 to about 1 gram of a compound having the formula

in which R'' is cyclohexadienyl, $C_1$-$C_{12}$ alkyl substituted cyclohexadienyl, phenylcyclohexadienyl, naphthyl, $C_1$-$C_{12}$ alkyl substituted naphthyl, indanyl, cyclohexenyl, $C_1$-$C_{12}$ alkyl substituted cyclohexenyl, phenylcyclohexenyl, cyclohexyl, $C_1$-$C_{12}$ alkyl substituted cyclohexyl, phenylcyclohexyl,

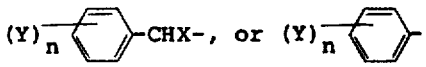

in which $n$ is zero or an integer from 1 to 3;

each Y independently is $C_1$-$C_{20}$ alkyl, phenyl, halo, $C_1$-$C_3$ alkoxy, $C_2$-$C_3$ alkenyl, carboxy, nitro, halomethyl, or phenylazo;

X is hydrogen, phenyl, benzyl, $C_1$-$C_{12}$ alkyl, $C_1$-$C_{12}$ alkylbenzyl, or $C_1$-$C_{12}$ alkylphenyl;

$m$ is 1 or 2; and

R' is a saturated or unsaturated group having from 8 to 25 carbon atoms, at least 8 carbon atoms of which are in a straight chain, and said group is bonded to the sulfonyl function through a primary or secondary carbon atom.

This invention is also directed a a method for reducing the cholesterol concentration in a warm-blooded animal having an elevated cholesterol level which comprises administering to said animal in an amount sufficient to lower the cholesterol concentration a compound of the formula

in which R', R'' and $m$ are as hereinbefore defined.

Benzenesulfonate esters, naphthylenesulfonate esters, and tosylate esters are recognized in the literature, see, for example, *Chemical Abstracts*, 61, (1964) 8181d. However, the cholesterol-lowering activity of the long chain sulfonate esters defined herein was not recognized prior to this invention.

DETAILED DESCRIPTION OF THE INVENTION

It has now been found that administration of a sulfonate ester of the formula defined hereinabove is effective in reducing the concentration of cholesterol in warm-blooded animals which exhibit hypercholesterolemia.

The sulfonate esters of this invention as well as those useful in the process and present in the pharmaceutical compositions of this invention have the particular structure defined hereinabove.

The portion of the molecule defined hereinabove as R'' refers to the tail moiety of the sulfonate ester. This moiety is a nuclear or polynuclear function, substituted or unsubstituted. Specifically, R' is cyclohexadienyl, $C_1$-$C_{12}$ alkyl substituted cyclohexadienyl, phenylcyclohexadienyl, naphthyl, $C_1$-$C_{12}$ alkyl substituted naphthyl, indanyl, cyclohexenyl, $C_1$-$C_{12}$ alkyl substituted cyclohexenyl, phenylcyclohexenyl, cyclohexyl, $C_1$-$C_{12}$ alkyl substituted cyclohexyl, phenylcyclohexyl, benzyl, benzyl substituted at from 1 to 3 positions on the ring and/or substituted at the alpha position, phenyl, or phenyl substituted at from 1 to 3 positions on the ring. Suitable ring substituents include, for example, methyl, ethyl, n-propyl, isopropyl, n-butyl, isobutyl, sec-butyl, tertiary-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, fluoro, bromo, chloro, iodo, methoxy, ethoxy, propoxy, vinyl, allyl, carboxy, nitro, chloromethyl, bromomethyl, trifluoromethyl, phenylazo, and the like.

Typical of the groups defined by R'' are cyclohexadienyl, naphthyl, 6-decylnaphthyl, 3-methylnaphthyl, 7-dodecylnaphthyl, indanyl, cyclohexenyl, 4-methylcyclohex-2-enyl, 4-decylcyclohex-1-enyl, 2-phenylcyclohex-1-enyl, α-benzylbenzyl, α-(p-methylbenzyl)-p-methylbenzyl, α-(p-decylbenzyl)-p-decylbenzyl, α-(p-dodecylbenzyl)benzyl, α-decyl-p-methylbenzyl, α-methyl-p-decylbenzyl, α-(p-decylphenyl)benzyl, p-tolyl, m-hexylphenyl, 2,5-dimethylphenyl, p-decylphenyl, p-octadecylphenyl, p-phenylphenyl, o-chlorophenyl, o-bromo-p-tolyl, p-iodophenyl, m-fluorophenyl, p-methoxyphenyl, m-isopropoxyphenyl, m-vinylphenyl, p-allylphenyl, p-carboxyphenyl, m-nitrophenyl, o-chloromethylphenyl, p-trifluoromethylphenyl, p-phenylazophenyl, and the like.

Preferably, R'' is cyclohexadienyl, naphthyl, indanyl, or

in which each Y independently is $C_1$-$C_{20}$ alkyl, phenyl, halo, $C_1$-$C_3$ alkoxy, $C_2$-$C_3$ alkenyl, carboxy, nitro, halomethyl, or phenylazo, and $n$ is zero or an integer from 1 to 3.

Preferably, R'' is a phenyl substituted in the para position with any of the above-mentioned substituents. More preferably, R'' is a p-alkylphenyl substituent in which the alkyl group has from 1 to 10 carbon atoms. Highly preferred substituents of this group are p-tolyl and p-decylphenyl.

R' of the sulfonate ester represents a group having from 8 to 25 carbon atoms, at least 8 carbon atoms of which are in a straight chain. This group represents the tail moiety of any long chain alcohol, and can be illustrated by octyl, nonyl, decyl, undecyl, undecen-3-yl, dodecyl, tridecyl, tetradecyl, pentadecyl, 3,8-11-trimethylpentadecyl, hexadecyl, 2,7,15-trimethyl-6-ethylhexadecyl, heptadecyl, heptadecyn-8-yl, octadecyl, nonadecyl, eicosyl, 5,14-dimethyleicosyl, heneicosyl, docosyl, tricosyl, tetracosyl, pentacosyl, and the like. Any of the above, as well as others, are available from the particular alcohol having the corresponding long chain group. In the event that m in the sulfonate ester is 2, R' in such ester represents the tail moiety of a glycol. Typical such glycols are 2,5-dihydroxyoctadecane, 3,11-dihydroxyheptadec-9-ene, 1,9-dihydroxydecane, 1,15-dihydroxyeicosane, and the like.

Although it is not essential, R' of the sulfonate ester defined hereinabove is preferably derived from the alcohol obtained by reduction of a saturated or unsaturated fatty acid. Typical saturated fatty acids give rise to many of the groups mentioned hereinabove and include, for example, caprylic, capric, lauric, myristic, palmitic, stearic, isostearic, arachidic, behenic, lignoceric, pentacosanoic, and the like. Typical unsaturated fatty acids include, for example, 9-decylenic, stillingic, 9-dodecylenic, palmitoleic, zoomaric, oleic, ricinoleic, petroselinic, elaidic, ricinelaidic, ricinenic, vaccenic, linoleic, linolenic, eleostearic, parinaric, gadoleic, erucic, brassidic, selacholeic, linolaidic, eicosatetraenoic, arachidonic, eicosapentaenoic, and the like. Other long-chain substituents included within the definition of R' are, for example, 10,10-dimethyl-1-undecyl, 17,-17-dimethyl-1-octadec-9-enyl, chaulmoogryl, 9-phenyl-1-nonyl, phytyl, retinyl, 17,17-dimethyloctadec-9-enyl, 18-phenyloctadec-9-enyl, 9,10-dibromooctadecyl, 9,10,12,13-tetrabromooctadecyl, 9,10-epoxyoctadecyl, 9-nonyloxynonyl, 1-chlorooctadecyl, 9,9-dimethyldecyl, 9-methyldecyl, 9-phenylnonyl, 9-carboxynonyl, 9-ethoxycarbonylnonyl, undec-10-enyl, 10-bromodecyl, 10-hydroxydecyl, and the like. The sulfonate esters defined hereinabove can be used either individually or as a mixture of any of them.

Likewise, the R' substituent of the sulfonates can be derived from alcohols obtained by reduction of fatty acids of natural oils, such as, hydrogenated coconut oil, corn oil, safflower oil, butter, lard, sardine oil, hempseed oil, linseed oil, perilla oil, oiticica oil, caya oil, walnut oil, poppy-seed oil, watermelon-seed oil, soybean oil, sunflower oil, rice-bran oil, pumpkin-seed oil, kaoliang oil, sesame oil, grape oil, cottonseed oil, olive oil, cashew oil, tsubaki oil, ergot oil, castor oil, peanut oil, palm oil, palmkernel oil, beef tallow, bone oil, horse fat, locust oil, chrysalis oil, shark oil, cuttlefish oil, sardine oil, mackerel oil, saury oil, herring oil, saurel oil, cod oil, trout oil, gray mullet oil, tunny oil, menuke oil, menhaden oil, eel oil, flatfish oil, whale oil, liver oil, residual oil, and the like.

R' represents a group having from 8 to 25 carbon atoms, at least 8 carbon atoms of which are in a straight chain. The group can be saturated or unsaturated and is attached to the sulfonyl function to form the sulfonate ester through a primary or secondary carbon atom. Although it is preferred that R' be a group containing only carbon and hydrogen, such is not essential. R' can contain, for example, one or more halogens, such as fluoro, chloro, bromo, or iodo, one or more epoxy groups, one or more ether linkages, one or more carboxyl groups, one or more alkoxycarbonyl groups, such as ethoxycarbonyl, one or more hydroxyls, and the like. Furthermore, R' can contain one or more aromatic substituents, such as phenyl rings.

R' can be saturated or unsaturated. Preferably, if R' represents an unsaturated group, such group will have from one to four double bonds. However, the extent of unsaturation present in R' is by no means restricted to four double bonds, and groups having five or more double bonds can likewise be employed. Moreover, R' can readily contain one or more acetylenic bonds in its structure.

Advantageously, the sulfonates are effective as cholesterol-lowering agents when administered orally. While the method of administering the sulfonates of this invention is not limited to oral administration, a decided advantage is evident in that the active sulfonates can be administered orally in any convenient manner. For example, they can be taken with an inert diluent or a pharmaceutical carrier, which can take the form of tablets, capsules, suspensions, emulsions, solutions, dispersible powders, and the like. Furthermore, the active sulfonates can be administered either individually or as mixtures of a plurality of active ingredients.

Doses of the sulfonate are administered to the recipient for the period during which a lowering of cholesterol is desired. The weight of the recipient will have an influence upon the size of the dose which is necessary to induce a particular level of cholesterol. generally, the sulfonate dosage should be from about 1 to about 100 milligrams (mg.) per kilogram (kg.) of body weight of the recipient per day throughout the period of desired cholesterol reduction. Preferably, the sulfonate is administered to provide from about 5 mg. to about 50 mg. per kg. of body weight daily.

Unit dosage forms generally contain from about 0.10 gm. to about 1.0 or more gm. of the sulfonate derivative, dependent upon the type of unit dosage, with or without significant quantity of an inert pharmaceutical carrier or diluent. Thus, for oral administration, capsules can contain from about 100 to 500 mg. of the sulfonate, with or without a pharmaceutical carrier or diluent. Tablets can be likewise composited. Inert diluents or carriers, for example, magnesium carbonate or lactose, can be used together with conventional disintegrating agents, for example, maize starch and alginic acid and lubricating agents, for example, magnesium stearate. By significant quantity of pharmaceutical carrier or diluent is intended an amount sufficient to render the sulfonate ester amenable to ready and efficient administration. Typically, the amount of carrier or diluent will range from 5 to 95% of the final composition, and preferably from 50 to 85% of the final composition.

Compositions of the invention can also be in the form of a nutritive preparation in which the active ingredient is mixed with one or more proteins such as, for example, casein, and/or one or more carbohydrates, such as, for example, various starches and sugars.

Relatively small amounts of the orally administered sulfonates are effective in producing the desired hypocholesterolemic effect. The sulfonates can be used to lower the cholesterol concentration in those instances in which the cholesterol concentration is at an excessive level. The dosages, methods, and time periods will be determined by the result desired in the particular case.

Administration of the sulfonate esters can also be by any of the other usual routes, including, for example, intraperitoneal, intramuscular, subcutaneous, and sublingual.

The sulfonate esters of this invention can be prepared by several recognized methods, the most typical of which involves the reaction of the corresponding sulfonyl halide, particularly the sulfonyl chloride, with an alcohol or glycol having the particular chain which is represented in the final sulfonate ester product. This reaction can be conveniently carried out in accordance with the procedure of Marvel, C. S., and Sekera, V. C., *Organic Syntheses Coll.* Vol. III, 366 (1955). In accordance with this procedure the sulfonyl halide is dissolved in an excess of pyridine at a temperature of from about 10°C. to about 20°C. To the resulting solution is then added dropwise an amount of the alcohol or glycol which, based upon the hydroxyl groups, is approximately equivalent to the amount of sulfonyl halide which is used. The reaction is terminated by pouring the reaction mixture onto a mixture of concentrated hydrochloric acid in ice. The sulfonate product is extracted from the mixture using an organic solvent, and the extract is washed with water, dried over a drying agent, and evaporated in vacuo to produce the product as a residue. The product may or may not require further purification. Should such purification be necessary, the product can be purified by any of several known techniques such as, for example, recrystallization, chromatographic separation, and the like.

In those instances in which R' of the sulfonate ester is not solely carbohydryl, it may be necessary to modify the preparation of the ester in order to obtain the desired final structure. This is particularly true in those instances in which the non-carbohydryl substituent intended to be present in R' is sufficiently reactive under the conditions of preparation of the sulfonate ester to be difficult to maintain intact. This necessitates the formation of a sulfonate ester structured so as to accomodate a subsequent insertion of the non-carbohydryl substituent.

For example, a sulfonate ester can be prepared in which R' is an alkenyl group tailored to the intended carbon chain and double bond position. This product can then be reacted in accordance with known techniques to add at the point of unsaturation, for example, by hydroxylation, halogenation, hydrohalogenation, epoxidation, and the like.

A detailed preparation of linoleyl tosylate will serve to exemplify a method by which the compounds of this invention as well as those which are used in the process of this invention can be prepared.

A. PREPARATION OF ETHYL LINOLEATE

About 4 gm. of sodium metal were added to 650 ml. of anhydrous ethanol. To the resulting mixture were added about 500 gm. of moisture-free safflower oil, and the mixture was refluxed for about 30 minutes. To the resulting reaction mixture were then added about 600 gm. of urea and 2,600 ml. of anhydrous ethanol, and the mixture was refluxed for about four hours until a homogeneous solution was obtained. The solution was then cooled and allowed to stand overnight at a temperature of from about 0°C. to about 5°C. During this time crystalline urea complexes formed which were removed by vacuum filtration and discarded. The ethanol was then removed from the filtrate by evaporation in vacuo, and the residue was transferred to a separatory funnel. Four separate volumes of hot water, each containing about 30 ml. of 3N hydrochloric acid and 25 mg. of hydroquinone, were added successively with shaking to dissolve excess urea which had crystallized during the evaporation of the ethanol from the mixture. An oil formed during the addition of the dilute acid, and the oil was extracted into several volumes of hexane; the aqueous layer was then discarded, and the hexane layer was washed three times with water to remove residual urea. The hexane solution was then allowed to stand overnight at a temperature of from about 0°C. to about −20°C. The cold solution was then filtered, the filtrate was evaporated in vacuo, and the mixture was again stored at a temperature of 0°C. to −20°C. The solution was again filtered, and the filtrate was evaporated in vacuo to produce a residue of crude ethyl linoleate.

B. PURIFICATION OF ETHYL LINOLEATE

A chromatographic column about 6 to 8 cm. in diameter and 40 to 50 cm. in length was packed with a mixture of 15 gm. of calcium carbonate and 135 gm. of florisil (60 to 100 mesh) containing about 7 percent water. To about 25 gm. of the crude ethyl linoleate were added about 40 ml. of ether and 60 ml. of hexane. The resulting solution was poured onto the column, and the column was then washed with 600 ml. of a 40:60 mixture of ether and hexane. The eluate was collected, and the solvent removed therefrom in vacuo. The residue, purified ethyl linoleate, was stored at 0°C. to −20°C. under nitrogen. (The crude ethyl linoleate also can be readily purified by distillation under a reduced pressure of about 1 mm.).

C. REDUCTION OF ETHYL LINOLEATE

A mixture of 4.67 gm. of lithium aluminum hydride and 300 ml. of anhydrous ether was refluxed for about 2 hours. Heating was discontinued and to the mixture were added dropwise 50 gm. of ethyl linoleate in an equal volume of anhydrous ether. The ethyl linoleate was added at a rate, without the addition of external heat, sufficient to maintain a gentle reflux of the mixture. Upon completion of addition of the ethyl linoleate, the resulting mixture was refluxed gently for an additional 0.5 hours. Heating was then discontinued, and ice cold water was carefully added dropwise until no further reaction occurred. The mixture was then poured onto about one liter of cold 10 percent aqueous sulfuric acid. The ether layer, containing linoleyl alcohol, was separated from the aqueous layer. The aqueous layer was extracted with additional quantities of ether, the ether extracts were combined with the original ether layer, and the total ether extract was dried over anhydrous sodium sulfate. The ether solution was then filtered, and the filtrate was evaporated in vacuo to a residue of linoleyl alcohol which was stored under nitrogen at −10°C.

D. PREPARATION OF LINOLEYL P-TOLUENESULFONATE

A mixture of 134.0 gm. (0.5 mole) of linoleyl alcohol in 158.0 gm. (2 moles) of pyridine was prepared. The mixture was maintained at a temperature of about 10°C. by ice-bath cooling. While cooling of the mixture was continued, 104.8 gm. (0.55 mole) of p-toluenesulfonyl chloride were added over a 30 minute period at a rate such that the temperature of the reaction mixture did not exceed 20°C. Upon completion of the addition of the sulfonyl chloride, the mixture was stirred for about 3 hours at about 10°C. To the reaction mixture was then added a mixture of 300 ml. of concentrated hydrochloric acid in one liter of ice water. The resulting mixture was then extracted three times with ether, and the ether extracts were combined and dried over anhydrous sodium sulfate. The ether solution was then filtered, and the filtrate was evaporated in vacuo at room temperature to produce crude linoleyl p-toluenesulfonate (tosylate).

E. PURIFICATION OF CRUDE LINOLEYL P-TOLUENESULFONATE

A glass column (38 mm. inner diameter × 90 cm. length) was packed with 250 gm. of 60/100 mesh hydrated florisil containing 7 percent water by weight. The packed column was washed with hexane, and about 8 gm. of the crude linoleyl tosylate in 50 ml. of dried hexane was charged to the column. Pure linoleyl tosylate was eluted from the column by charging successively at a flow rate of one drop per second 250 ml. of hexane, 500 ml. of 97:3 volume ratio hexane:ether, and one liter of 85:15 volume ratio hexane:ether. By this method a yield of about 80 percent of pure linoleyl tosylate was obtained.

Analysis, Calculated for $C_{25}H_{40}O_3S$:

C, 70.88; H, 10.20; S, 7.66; O, 11.34

Found: C, 70.64; H, 9.48; S, 6.83; O, 12.69

A specific example of the preparation of a sulfonate ester in which R' is non-carbohydryl is as follows:

9-Decenyl p-toluenesulfonate can be used in the preparation of 10-hydroxy-decyl p-toluenesulfonate. In this case 9-decenyl tosylate, prepared from 9-decen-1-ol and p-toluenesulfonyl chloride in pyridine, is hydroborated, and the resulting borane intermediate is oxidized to 10-hydroxydecyl tosylate in accordance with the procedure of Brown, H. C., and Keblys, K. A., J. Am. Chem. Soc., 86, 1791–5 (1964). Specifically, 6.23 g. (20.1 mmol) of 9-decenyl tosylate are added dropwise to 8.5 mmol of borane in tetrahydrofuran at 0°C. and under nitrogen atmosphere. The solution is stirred at 0°C. for 1 hr., and then 2.4 ml. of 3M NaOH and 2.2 ml. (24 mmol) of 33% $H_2O_2$ are added at 10°–25°C. The tosylate is extracted with ether and dried over anhydrous $MgSO_4$. Filtration of the solution and evaporation of solvent in vacuo gives crude 10-hydroxydecyl tosylate, which can then be purified by recognized procedures.

Other examples of compounds which are preparable in accordance with known techniques and by a procedure, in general, similar to the above are:

9,10-dibromooctadecyl tosylate,
9,10-epoxyoctadecyl tosylate,
10-bromoundecyl tosylate, and the like.

This invention and the activity of the compounds defined thereby is illustrated by feeding male, Wistar rats a balanced synthetic diet having one of the compositions delineated in Table I following. The rats were fed this diet for four weeks beginning at weaning. During the next four weeks, the rats were fed the same hypercholesterolemic diet with the exception that non-control rats received additionally $3.6 \times 10^{-3}$ moles of the test compound per kilogram of the diet. Blood samples were then taken from the rats by cardiac puncture, the plasma was analyzed for cholesterol, and the rats were sacrificed by cranial blow for determination of the liver cholesterol level.

TABLE I

COMPOSITION OF DIETS

| Component | Percent by Weight | | |
|---|---|---|---|
| | A | B | C |
| Cerelose (Dextrose) | 76.30 | 71.25 | 52.50 |
| Casein | 12.63 | 13.12 | 15.62 |
| Fat[1] | 1.00 | 5.00 | 20.00 |
| Mineral mixture[2] | 4.00 | 4.20 | 4.97 |
| Celluflour[3] | 2.11 | 2.25 | 2.62 |
| Vitamins[4] | 2.46 | 2.56 | 3.06 |
| Cholesterol | 1.00 | 1.05 | 1.24 |
| Sodium glycocholate | 0.50 | 0.52 | 0.62 |

[1]Hydrogenated coconut oil; safflower oil; lard; or beef tallow.
[2]Mineral mixture contained: NaCl, 173 g; $MgSO_4$, 266 g; $Na_2HPO_4 \cdot H_2O$, 347 g; $K_2HPO_4$, 954 g; $Ca(HPO_4)_2 \cdot H_2O$, 540 g, calcium lactate, 1300 g; ferrous citrate, 118 g.
[3]Chicago Dietetic Supply House Inc., Chicago, Ill.
[4]Vitamin mixture contained: thiamine hydrochloride, 2.4 g; riboflavin, 1.2 g; pyridoxine HCl, 0.6 g; calcium pantothenate, 7.2 g; nicotinic acid, 3.0 g; p-aminobenzoic acid, 1.2 g; biotin, 0.24 g; i-inositol, 144 g; choline chloride, 180 g; folic acid, 1.2 g; vitamin $B_{12}$ (0.1%), 0.22 g; menadione, 6.0 g; vitamin A (20,000 USP units/g), 12.0 g; premixed on 2640.7 g. casein and added to the diet replacing an equivalent amount of casein; vitamin E, 0.125 g/kg diet and vitamin D, 1920 USP units per kg diet, were prepared as hexane extracts and added to each diet.

Results are reported in Table II following.

TABLE II

HYPOCHOLESTEROLEMIC ACTIVITY $$[R - SO_3\text{]}_m^- R'$$

| R | R' | m | Diet | Plasma Cholesterol mg./100 ml. | Liver Cholesterol mg./g. |
|---|---|---|---|---|---|
| CONTROL | — | — | A | 178 ± 30 | 46.70 ± 3.44 |
| p-tolyl | oleyl | 1 | A | 61 ± 5 | 6.52 ± 0.66 |
| p-tolyl | linoleyl | 1 | A | 73 ± 5 | 9.51 ± 1.28 |
| p-tolyl | chaulmoogryl | 1 | A | 107 ± 6 | 20.93 ± 1.27 |
| p-tolyl | hexyl-1-dodecylene | 2 | A | 109 ± 7 | 20.71 ± 1.21 |
| CONTROL | — | — | A | 289 ± 35 | 74.5 + 5.9 |

TABLE II — Continued

HYPOCHOLESTEROLEMIC ACTIVITY
$[R-SO_3^-]_m R'$

| R | R' | m | Diet | Plasma Cholesterol mg./100 ml. | Liver Cholesterol mg./g. |
|---|---|---|---|---|---|
| p-cumyl | linoleyl | 1 | A | 67 ± 4 | 14.0 ± 1.2 |
| p-t-butylphenyl | linoleyl | 1 | A | 73 ± 5 | 21.9 ± 1.4 |
| 3,4-dichlorophenyl | linoleyl | 1 | A | 74 ± 6 | 22.0 ± 1.9 |
| 5-indanyl | linoleyl | 1 | A | 109 ± 12 | 29.8 ± 2.1 |
| p-fluorophenyl | linoleyl | 1 | A | 98 ± 6 | 36.0 ± 1.8 |
| p-carboxyphenyl | linoleyl | 1 | A | 204 ± 14 | 65.0 ± 4.3 |
| CONTROL | — | — | B | 277 | 70 |
| p-tolyl | decyl | 1 | B | 171 | 55 |
| p-tolyl | eleostearyl | 1 | B | 170 | 50 |
| p-(n-propyl)phenyl | decyl | 1 | B | 133 | 52 |
| p-tolyl | ricinoleyl | 2 | B | 201 | 35 |
| cyclohexyl | decyl | 1 | B | 220 | 73 |
| 1,3-cyclohexadienyl | decyl | 1 | B | 228 | 64 |
| CONTROL | — | — | A | 235 | 41.6 |
| p-chlorophenyl | linoleyl[1] | 1 | A | 62 | 7.9 |
| p-methoxyphenyl | linoleyl[1] | 1 | A | 97 | 14.6 |
| 2-naphthyl | linoleyl[1] | 1 | A | 105 | 20.0 |
| p-(phenylazo)phenyl | linoleyl[1] | 1 | A | 98 | 25.9 |
| CONTROL | — | — | A | 249 | 37.3 |
| 2,4,6-trimethylphenyl | linoleyl | 1 | A | 140 | 24.3 |
| p-vinylphenyl | linoleyl | 1 | A | 200 | 16.7 |
| 2,4-dimethylphenyl | linoleyl | 1 | A | 107 | 9.7 |
| p-tolyl | undecyl | 1 | A | 163 | 29.4 |
| CONTROL | — | — | A | 284 | 36.6 |
| p-tolyl | cetyl | 1 | A | 91 | 18.3 |
| p-tolyl | tridecyl | 1 | A | 106 | 16.7 |
| CONTROL | — | — | A | 301 | 28.4 |
| 2-chloro-4-methyl-phenyl | linoleyl | 1 | A | 70 | 5.9 |
| p-ethylphenyl | linoleyl | 1 | A | 55 | 6.8 |
| CONTROL | — | — | C | 511 ± 79 | —[2] |
| p-tolyl | linoleyl | 1 | C | 246 ± 20 | 73 ± 1 |
| p-ethylphenyl | linoleyl | 1 | C | 155 ± 8 | 56 ± 4 |
| p-(n-propyl)phenyl | linoleyl | 1 | C | 132 ± 7 | 41 ± 5 |
| p-(n-butyl)phenyl | linoleyl | 1 | C | 123 ± 8 | 56 ± 4 |
| p-cumyl | linoleyl | 1 | C | 134 ± 7 | 51 ± 6 |
| p-(sec-butyl)phenyl | linoleyl | 1 | C | 135 ± 7 | — |
| p-(t-butyl)phenyl | linoleyl | 1 | C | 190 ± 8 | 73 ± 9 |
| p-isobutylphenyl | linoleyl | 1 | C | 168 ± 16 | 49 ± 5 |
| p-isoamylphenyl | linoleyl | 1 | C | 136 ± 10 | 57 ± 5 |
| p-(sec-amyl)phenyl | linoleyl | 1 | C | 142 ± 12 | 58 ± 4 |
| p-(t-amyl)phenyl | linoleyl | 1 | C | 157 ± 11 | 44 ± 10 |
| p-chlorophenyl | linoleyl | 1 | C | 162 ± 5 | 58 ± 5 |
| p-bromophenyl | linoleyl | 1 | C | 148 ± 11 | 56 ± 5 |
| p-iodophenyl | linoleyl | 1 | C | 160 ± 9 | 40 ± 3 |
| p-chloromethylphenyl | linoleyl | 1 | C | 158 ± 10 | 46 ± 2 |
| CONTROL | — | — | C | 323 ± 42 | 91 ± 5 |
| p-tolyl | oleyl | 1 | C | 146 ± 8 | 64 ± 2 |
| p-(n-propyl)phenyl | oleyl | 1 | C | 133 ± 10 | 38 ± 1 |
| p-hexylphenyl | oleyl | 1 | C | 181 ± 18 | 85 ± 6 |
| p-decylphenyl | oleyl | 1 | C | 108 ± 2 | 13 ± 2 |
| p-pentadecylphenyl | oleyl | 1 | C | 134 ± 13 | 71 ± 3 |
| p-nonadecylphenyl | oleyl | 1 | C | 201 ± 9 | 61 ± 7 |
| CONTROL | — | — | C | 271 ± 15 | 102 ± 7 |
| p-tolyl | linoleyl | 1 | C | 162 ± 9 | 78 ± 6 |
| p-(n-propyl)phenyl | linoleyl | 1 | C | 131 ± 8 | 52 ± 2 |
| p-hexylphenyl | linoleyl | 1 | C | 214 ± 29 | 98 ± 2 |
| p-decylphenyl | linoleyl | 1 | C | 102 ± 7 | 25 ± 3 |
| p-pentadecylphenyl | linoleyl | 1 | C | 162 ± 22 | 90 ± 6 |
| p-nonadecylphenyl | linoleyl | 1 | C | 172 ± 12 | 71 ± 6 |
| CONTROL | — | — | C | 316 ± 46 | — |
| p-tolyl | decyl | 1 | C | 261 ± 27 | — |
| p-(n-propyl)phenyl | decyl | 1 | C | 248 ± 20 | — |
| p-hexylphenyl | decyl | 1 | C | 226 ± 21 | — |
| p-decylphenyl | decyl | 1 | C | 129 ± 11 | — |
| p-pentadecylphenyl | decyl | 1 | C | 163 ± 18 | — |
| p-nonadecylphenyl | decyl | 1 | C | 180 ± 9 | — |
| CONTROL | — | — | A | 218 | 60 |
| phenyl | oleyl | 1 | A | 124[3] | 30 |
| p-tolyl | —[4] | — | A | 80[5] | — |
| p-tolyl | linoleyl | 1 | A | 65 | 15 |
| p-tolyl | linolaidyl | 1 | A | 68 | 19 |
| p-tolyl | oleyl | 1 | A | 68 | 9 |
| p-tolyl | linolenyl | 1 | A | 80 | 8 |
| p-tolyl | arachidonyl | 1 | A | 147 | 33 |
| CONTROL | — | — | A | 194 | 43 |
| p-tolyl | ethyl | 1 | A | 202 | 48 |
| p-tolyl | caproyl | 1 | A | 291 | 50 |
| p-tolyl | capryl | 1 | A | 106 | 14 |
| p-tolyl | lauryl | 1 | A | 137 | 15 |
| p-tolyl | stearyl | 1 | A | 81 | 27 |
| CONTROL | — | — | A | 350 | 59 |
| phenyl | linoleyl | 1 | A | 185 | 31 |
| p-bromophenyl | linoleyl | 1 | A | 100 | 18 |
| 2,5-dimethylphenyl | linoleyl | 1 | A | 153 | 36 |
| p-nitrophenyl | linoleyl | 1 | A | 158 | 24 |

Table II – Continued

HYPOCHOLESTEROLEMIC ACTIVITY
$$[R-SO_3]_m\text{—}R'$$

| R | R' | m | Diet | Plasma Cholesterol mg./100 ml. | Liver Cholesterol mg./g. |
|---|---|---|---|---|---|
| methyl | linoleyl | 1 | A | 243 | 75 |
| p-tolyl | linoleyl | 1 | A | 102 | 19 |
| CONTROL. | — | — | A | 175 | 72.9 |
| p-tolyl | linoleyl | 1 | A | 69 | 20.3 |
| p-tolyl | —[4] | — | A | 65 | 25.2 |
| p-tolyl | —[7] | — | A | 58 | 22.1 |
| p-tolyl | —[8] | — | A | 60 | 23.7 |
| p-tolyl | —[9] | — | A | 71 | 17.9 |
| p-tolyl | —[10] | — | A | 62 | 17.2 |
| p-tolyl | —[11] | — | A | 60 | 28.4 |

Footnotes:
[1] Sulfonate ester administered at 0.15% by weight of diet.
[2] Control liver cholesterol samples were lost. A previous similar experiment extending over an eight week period yield a control value of 172 ± 6.5 and a linoleyl tosylate value of 124 ± 4.7.
[3] Sulfonate ester administered at 0.5% by weight of diet.
[4] Alcohol moieties from reduced olive oil fatty acids.
[5] Sulfonate ester mixture administered at 1.0% by weight of diet.
[6] Alcohol moieties from reduced butter fatty acids.
[7] Alcohol moieties from reduced lard fatty acids.
[8] Alcohol moieties from reduced safflower oil fatty acids.
[9] Alcohol moieties from reduced sardine oil fatty acids.
[10] Alcohol moieties from reduced corn oil fatty acids.
[11] Alcohol moieties from reduced hydrogenated coconut oil fatty acids.

I claim:

1. A process for reducing the blood cholesterol concentration in a warm-blooded animal exhibiting hypercholesterolemia which comprises administering to said animal in an amount sufficient to lower said cholesterol concentration a compound of the formula $$R''\text{—}SO_3\text{—}R'$$

in which R'' is cyclohexadienyl, naphthyl, indanyl, cyclohexyl, or

in which n is zero or an integer from 1 to 3, and each Y independently is $C_1$-$C_{20}$ alkyl, phenyl, halo, $C_1$-$C_3$ alkoxy, $C_2$-$C_3$ alkenyl, carboxy, nitro, halomethyl, or phenylazo; and R' is a saturated or unsaturated hydrocarbon group having from 8 to 20 carbon atoms, at least 8 carbon atoms of which are in a straight chain, and said group is bonded to the sulfonyl function through a primary or secondary carbon atom.

2. Process of claim 1, in which R'' is cyclohexadienyl, naphthyl, indanyl, or

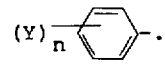

3. Process of claim 2, in which R' is the alcohol derivative of a saturated or unsaturated fatty acid.

4. Process of claim 3, in which R' is unsaturated and has from one to four double bonds.

5. Process of claim 4, in which R'' is

6. Process of claim 5, in which Y is $C_1$-$C_{20}$ alkyl.
7. Process of claim 6, in which R' is linoleyl.
8. Process of claim 6, in which R' is oleyl.
9. Process of claim 8, in which R'' is p-tolyl.
10. Process of claim 8, in which R'' is p-decylphenyl.
11. Process of claim 1, in which the compound is administered orally in an amount of from about 5 mg. to about 50 mg. per kilogram of body weight of said recipient per day.

* * * * *